April 14, 1970  G. E. F. HOLM  3,506,121
METHOD AND DEVICE FOR SCREENING OF A FIBER SUSPENSION
Filed May 17, 1968
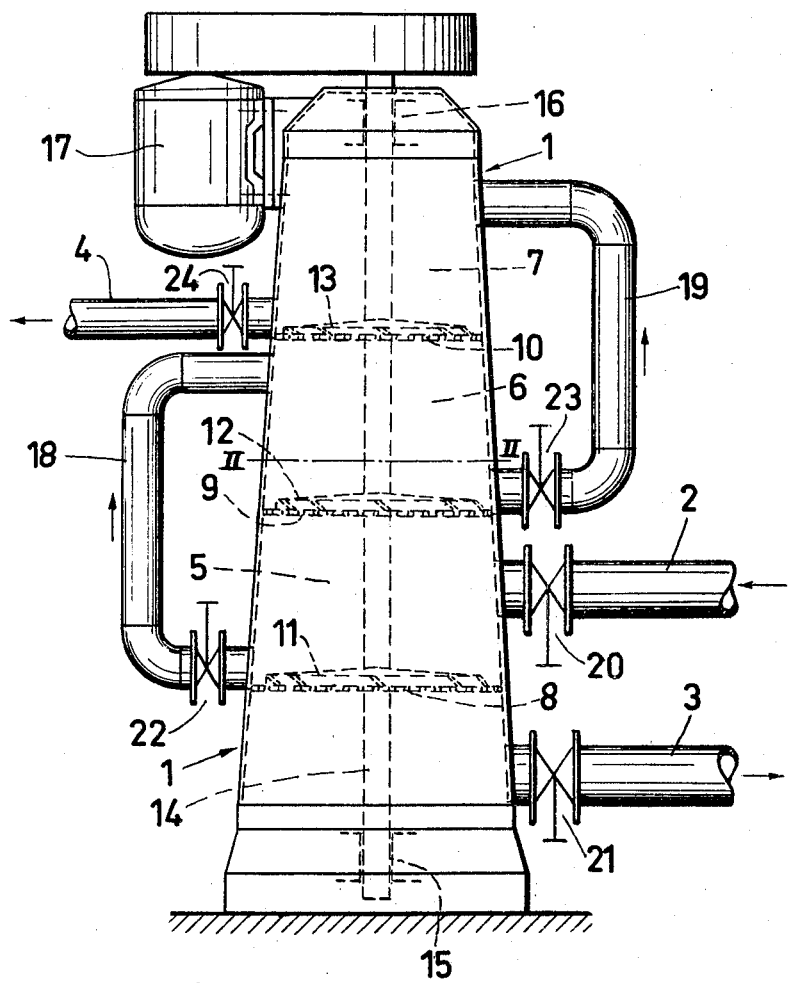
FIG.1
FIG.2
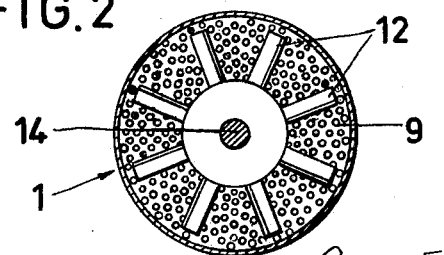
INVENTOR
Gösta Eskil Fredrik Holm
BY Cushman, Darby & Cushman
ATTORNEYS

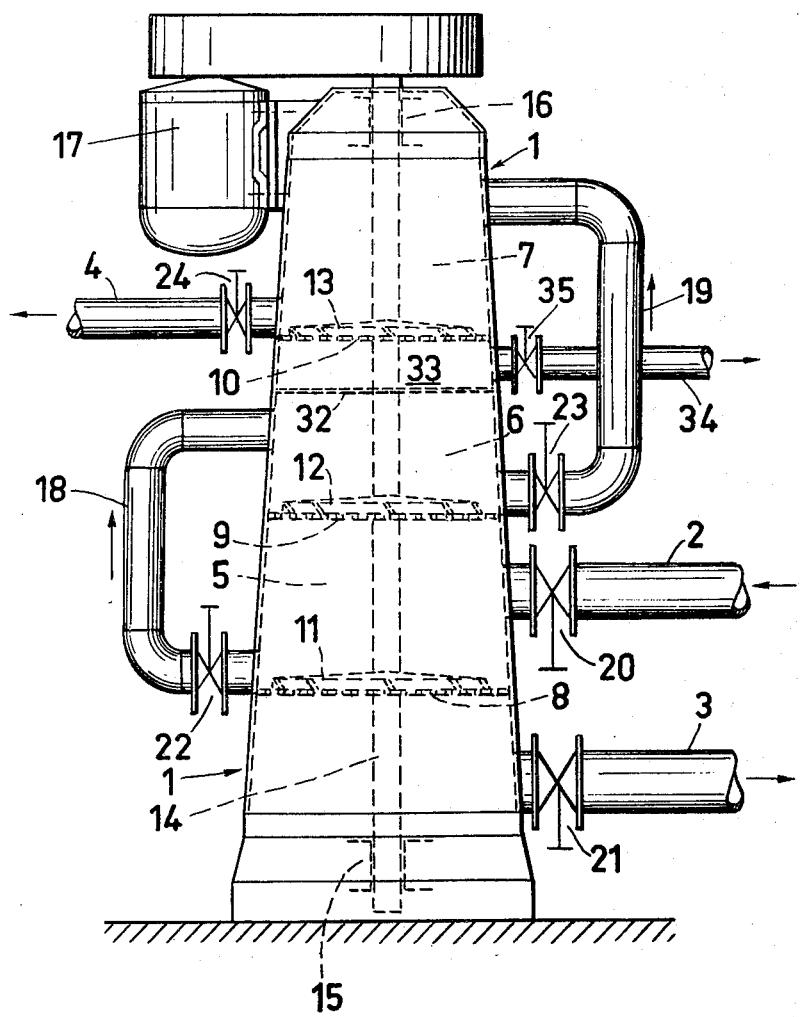

United States Patent Office 3,506,121
Patented Apr. 14, 1970

3,506,121
METHOD AND DEVICE FOR SCREENING
OF A FIBER SUSPENSION
Gosta E. F. Holm, Fogelmarksgatan 7,
Vastervik, Sweden
Filed May 17, 1968, Ser. No. 730,037
Claims priority, application Sweden, May 17, 1967
6,879/67
Int. Cl. B07b 1/04
U.S. Cl. 209—273    9 Claims

ABSTRACT OF THE DISCLOSURE

A fractional screening of a fiber suspension at least two screening chambers is achieved by introducing a fiber suspension into a first screening chamber from a second screening chamber, which is connected to the first screening chamber, by introducing the accept portion of the suspension into the second screening chamber from a third screening chamber, and by leading the reject portion in a direction opposite that of the accept portion of the suspension.

Figure 3:
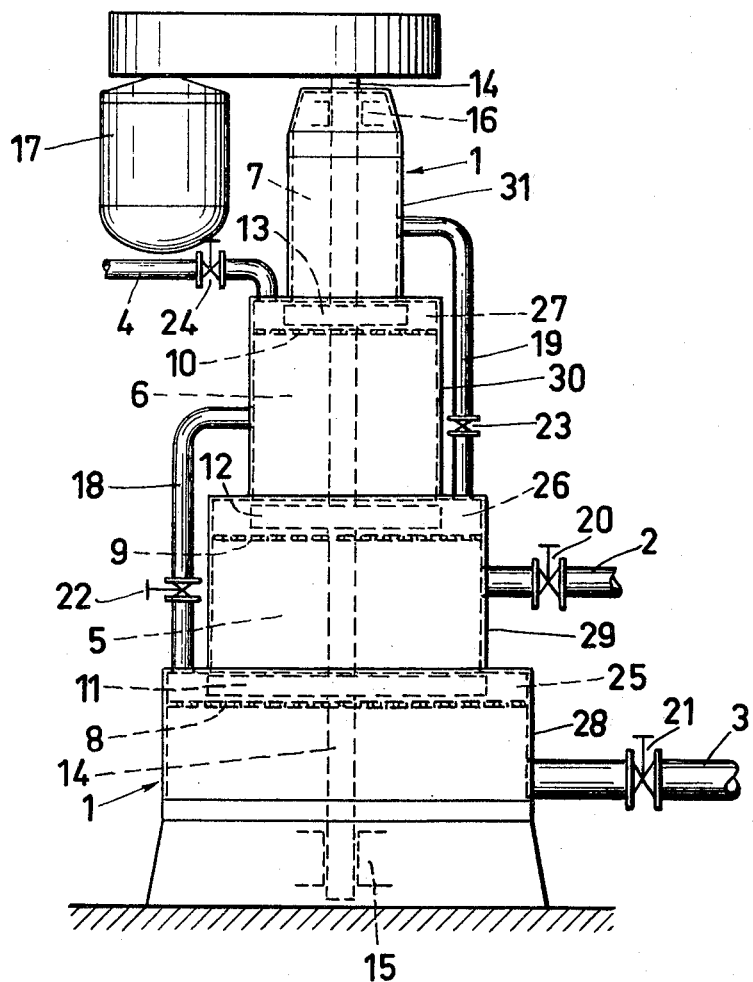

The device for fractionated screening has a closed container with a discharge outlet for the reject portion and an outlet for accept portion of the suspension, between which the container is divided into at least two screening chambers by screening plates, one inlet for introducing the fiber suspension initially, means for transport of the reject from each of the screening chambers to another screening chamber in the direction to the reject discharge outlet, except for the screening chamber with the discharge outlet for the reject portion.

BACKGROUND OF THE INVENTION

Methods and devices used in the prior art so far have suffered from several disadvantages. One of the difficulties has been to achieve a fully satisfactory separation of the fiber suspension, by which the retained portion of the fiber suspension contains only fibers of an approvable nature, whereas the discharge portion of the fiber suspension is free from such fibers and only contains the non-desired elements in the fiber suspension. Another difficulty has been to prevent clogging of screen plates, wire cloths and corresponding devices. There is also the particularly difficult problem of screening of pulp from waste paper, which often contains plastic sheeting and similar impurities. Moreover it is desirable for economic reasons that the screening device be simple and compact so that it requires low initial costs and small space and that the screening device have a great capacity relative to its size.

DISCLOSURE OF THE INVENTION

According to the present method, screening of a feed fiber suspension is achieved by introducing fiber suspension accept fraction which is to be recovered into a first screening chamber from a second screening chamber which is connected to the first screening chamber, by introducing an accept fiber suspension into the second screening chamber from a third screening chamber, and by leading the reject portion of the screening chambers for instance through conduits in a direction opposite to that of the accept fiber suspension, a fractional screening thereby is obtained. The fiber feed suspension is preferably introduced into the first screening chamber, but, if desired, it can also be introduced into one of the other screening chambers. Sucking of fibers into the screening means of the chambers is prevented by keeping the chambers filled with fiber suspension so that all the screening plates are thereby completely surrounded by fiber suspension, whereas the transport of accept suspension from one chamber to another takes place by maintaining suitable pressure differences in the fiber suspensions in the different chambers. Clogging of the screening means is avoided by producing pulsating pressure waves in the fiber suspension and by continuously removing impurities along with the reject from the screening chambers.

Moreover it may in certain cases be desirable to take out an intermediate fraction of the fiber suspension which can be used after working up for some special purpose. The intermediate fraction can be obtained by performing an extra screening of the fiber suspension in addition to a fractional screening according to the present invention, for instance in one or several screening chambers forming a special screening device with a separate screening chamber.

The screening device for performing the process of this invention comprises a closed container, with an outlet for the accept fraction of the suspension and a discharge outlet for the reject portion between which the container is divided into two or several screening chambers by screen-plates, one inlet for the feed fiber suspension, preferably to the screening chamber located nearest to the accept outlet; means, preferably pressure producing means, for transport of the reject for instance through conduits drawn outside the container, from each of the screening chambers to another screening chamber in the direction of the reject discharge outlet, but except for the screening chamber with the reject outlet, from which screening chamber discharge is lead out through the reject discharge outlet.

In order to obtain a simple construction, the container is preferably made straight with circular cross section, the screen plates being adapted substantially perpendicularly to the center line of the container. The pressure producing means, for transport of the reject from the screening chambers preferably may consist of rotors attached to a shaft centrally passing through the screening chambers and situated near to the screening plates. Also other means for transport of the reject as pumps can be used.

The rotors are designed in such a way that at rotation, in addition to a pressure increase in the fiber suspension at the periphery of the rotor there is also caused a pulsating pressure wave in the fiber suspension. This effect can be obtained for instance by designing the rotors according to the hydrofoil principle.

As a rule, as the load on the different screening chambers decreases from the screen chamber connected with the inlet for the fiber suspension in the direction of the rejects discharge outlet, it is often possible to reduce the diameter of the container and simultaneously the surface of the screening plates from the screen chamber with the inlet of the fiber suspension in the direction of the reject outlet.

The walls of the container can be designed so that they promote a pressure increase in the fiber suspension at the periphery of the rotors. This can be achieved by screening off the annular space in the screening chamber surrounding the periphery of the rotors completely or partly from the remaining part of the screening chamber. For instance the part of the screening chamber, in which the rotor is, can have a greater diameter than the remaining part of the screening chamber.

By separating in a suitable way by means of a partition wall and a screening device according to the invention comprising at least three screening chambers in two separate parts, a separation of the fibers in three fractions can also be achieved.

DETAILED DESCRIPTION

The invention will be described more in detail in connection with the enclosed drawings, in which FIGURE 1 shows a vertical section of the screening device according to the invention. FIGURE 2 shows a cross section of the screening device in FIGURE 1 along the line II—II. FIGURE 3 shows an additional embodiment of the screening device of the invention in vertical section, whereas FIGURE 4 illustrates a vertical section of a device according to the invention for dividing the fiber suspension into three fractions.

The screening device according to FIGURES 1 and 3 consists of a straight container 1 with circular cross section. The container 1 is provided with an inlet 2 for the feed fiber suspension, an outlet 3 for the accept portion of the suspension and a rejects discharge outlet 4. The container 1 is divided into three screening chambers 5, 6 and 7 by means of screening plates 8, 9 and 10, which have been adapted substantially perpendicularly to the center line of the container 1. Near to the screening plates, for instance at a distance of 1.5 mm., there are rotors 11, 12 and 13, which are attached to a shaft 14, centrally passing through the screening chambers and mounted in the points 15 and 16 and driven by an electric motor 17. The rotors 11, 12 and 13 are shaped so that they at rotation produce a pulsating pressure wave in the fiber suspension. Furthermore there are conduits 18 and 19 for the transport of the discharge from the screening chambers 5 and 6 respectively and valves 21, 22, 23 and 24 for regulation of different flows of the fiber suspension.

In operation the feed fiber suspension is introduced through the inlet 2 into the screening chamber 5. Part of the fiber suspension, the accept portion from the the screening chamber 6, passes through the screening plate 8 and is taken out as accept fiber suspension through the outlet 3. Another part of the fiber suspension is passed through the conduit 18 to the screening chamber 6 on account of the pressure increase produced by the rotating rotor at the periphery of the rotor. The fiber suspension in the screening chamber 6 is separated in the same way as the fiber suspension in the screening chamber 5, the accept portion from the screening chamber 6 being directly introduced into and mixed with the fiber suspension in the screening chamber 5, whereas another part of the rejects discharge of the screening chamber 6, is passed through the conduit 19 to the screening chamber 7. The fiber suspension in the screening chamber 7 is again divided in the same way as the fiber suspensions in the screening chambers 5 and 6, the accept portion from the screening chamber 7 being entered and mixed with the fiber suspension in the screening chamber 6, whereas the rejects discharge of the screening chamber 7 is removed through the reject discharge outlet 4.

If an air zone is formed at the screening plates, this may cause that the screening is impaired, for instance on account of the fibers being sucked to the screening plates. To avoid this the level of the liquid is maintained in operation at such a height that all screening plates are surrounded by the fiber suspension. Moreover, by the rotors suitable pressure differences are maintained in the fiber suspension between the screening chambers in order to obtain suitable velocities of the flow of retained suspension through the screening plates. The size of the pressure differences can be adjusted by means of the valves 21, 22, 23 and 24. Pumps or other suitable devices might also be used. On account of their design the rotors cause by rotation also a pulsating pressure wave in the fiber suspension, clogging of the screening plates being prevented.

The screening device shown in FIGURE 3 differs from the screening device in FIGURE 1, as the screening chambers have been designed in a special way to obtain a greater pressure increase in the fiber suspension at the periphery of the rotors. The annular areas 25, 26 and 27 surrounding the rotors are completely or partly screened from the other parts of the screening chambers. In FIGURE 3 this is achieved by the container consisting of cylinders 28, 29, 30 and 31 with different diameters. The screening plates divide the container in screening chambers consisting of two cylinders with different diameters. The rotor is placed in the cylinder with the greater diameter. This cylinder has a thickness roughly corresponding to the thickness of the rotor. The conduits 18, 19 and 20 for transport of the discharge issue from the annular spaces 25, 26 and 27.

The screening device according to FIGURE 4 differs from the screening device according to FIGURE 1, as a partition wall 32 has been placed in the screening chamber 6, a separate accept chamber 33 for the screening chamber 7 being obtained, and as an outlet 34 for the intermediate fraction leads from the accept chamber 33. The outflow can preferably be regulated by means of the valve 35. The apertures of the screening plate 10 are preferably somewhat bigger than those of the screening plates 8 and 9, for instance 3 and 2 mm. respectively.

The screening device according to the invention in the first place intended for cellulose fiber material as pulp fibers, especially pulp from waste paper. In order to obtain a fractional screening the screening device must consist of at least two screening chambers, whereas there is no special upper limit for the number of screening chambers. Of course it is also possible according to the invention to use other means than conduits for the transport of the reject portion. The conduits can also be drawn in another way than indicated in FIGURES 1 and 3. The only condition is that the reject is transported in some suitable way in a direction opposite to that of the accept portion. The perforations of the screening plates can each have conventional form, for instance circular or conical holes, or slots. A suitable size of the perforations is about 2 mm. If desired, the perforations of the screening plates can have different form between themselves and/or size, but preferably the perforations have the same size and form for all the screening plates. The location of the device in the vertical and horizontal plane can be quite arbitrary. The embodiment according to FIGURE 1 can for instance be mounted in horizontal position or, if desired, the device can be turned upside down, the accept suspension being lead upwards. Moreover it may be suitable, in screening of pulp from waste paper according to the invention, to carry out a simple pre-screening of the fiber suspension in order to remove certain impurities as clips and other heavier objects. This pre-screening can for instance be performed by means of a Jönsson type screen.

What is claimed is:

1. A method of screening a fiber suspension in a device having a plurality of screening chambers which comprises introducing a fiber suspension into a first screening chamber of said device and therein effecting a separation of said fiber suspension into an accept portion and a reject portion by passing the accept portion through a screening plate in said first screening chamber, passing said accept fraction to a discharge outlet for said accept portion for said device, and passing the reject portion of the fiber suspension in an opposite direction to that of the retained portion of the fiber suspension to a second screening chamber, wherein a separation similar to that effected in said first screening chamber is carried out, the accept portion of fiber suspension from said second screening chamber being passed to the first screening chamber and the reject portion being passed to a third screening chamber for additional separation in the same manner as in the first and second screening chambers.

2. The method according to claim 1, wherein the screening chambers are kept filled with fiber suspension so that all screening plates are completely surrounded by fiber suspension and that suitable pressure differences are maintained in the fiber suspensions in the different screening chambers.

3. The method according to claim 1, wherein pulsating pressure waves are produced in the fiber suspension.

4. The method according to claim 1, wherein the fiber suspension is divided into an accept portion, reject portion and an intermediate fraction by an extra screening of the fiber suspension being performed.

5. A screening device for fractionally screening a fiber suspension comprising a closed circular cross-section container with an outlet for the accept portion of said fiber suspension and discharge outlet for the reject portion, said closed container having between the two said outlets plural screening chambers separated by screening plates and an inlet for the fiber suspension, means connecting the said screening chambers for transport of the reject portion of the fiber suspension in the direction of the discharge outlet, from the screening chamber having the fiber suspension inlet to the subsequent screening chamber and similar means for transport of the reject portion of the suspension from the subsequent screening chamber to the next subsequent screening chamber, the inlet for the fiber suspension being located in the screening chamber nearest to the outlet for the accept portion of the fiber and the means for transport of the reject from one screening chamber to the next being a pressure producing means, and said screening plates being disposed substantially perpendicularly to the center line of said closed container and each screening chamber, said pressure producing means being in the form of a rotor attached to a shaft passing centrally through the screening chambers.

6. The screening device according to claim 5, wherein the rotors are constructed and arranged to cause a pulsating pressure wave in the fiber suspension, whereby clogging of the screening plates is prevented.

7. The screening device according to claim 6, wherein each screening chamber has upper and lower wall portions of different diameters, the lower wall portion being of greater diameter and defining an annular space surrounding the periphery of the rotor and above the screening plate.

8. The screening device according to claim 5, wherein the diameter of the container decreases from the screening chamber with the inlet of the fiber suspension in the direction to reject outlet.

9. A screening device according to claim 5 comprising a partition wall separating the closed container in two separate parts in such a way that one of the screening chambers is divided into a screening chamber as well as a separate accept chamber for the screening chamber located nearest to the reject discharge outlet, an outlet leading from said separate accept chamber, the screening plates having apertures which differ in size relative to each other.

References Cited

UNITED STATES PATENTS

| | | | |
|---|---|---|---|
| 2,713,977 | 7/1955 | Noll | 209—250 XR |
| 3,049,467 | 8/1962 | Curry | 209—211 XR |

OTHER REFERENCES

German printed application, No. 1,170,226, May 14, 1964.

FRANK W. LUTTER, Primary Examiner

U.S. Cl. X.R.

209—355, 358; 210—73